United States Patent [19]

Hartshorn

[11] 4,104,190

[45] Aug. 1, 1978

[54] GENERATION OF CHLORINE DIOXIDE FOR DISINFECTION AND STERILIZATION

[75] Inventor: Stephen R. Hartshorn, Harlow, England

[73] Assignee: Minnesota Mining and Manufacturing Company, Saint Paul, Minn.

[21] Appl. No.: 779,696

[22] Filed: Mar. 21, 1977

[30] Foreign Application Priority Data

Mar. 23, 1976 [GB] United Kingdom ............... 11676/76

[51] Int. Cl.$^2$ .......................... D06L 3/08; C01B 11/02
[52] U.S. Cl. ............................... 252/187 R; 8/108 A; 252/95; 423/477; 423/470; 424/149
[58] Field of Search ............ 252/187 R, 95; 423/477, 423/478; 8/108 A; 424/149

[56] References Cited

U.S. PATENT DOCUMENTS

| | | | |
|---|---|---|---|
| 2,131,447 | 9/1938 | Logan | 423/477 |
| 3,123,521 | 3/1964 | Wehtworth et al. | 252/187 R |
| 3,278,447 | 10/1966 | McNicholas | 252/187 R |
| 3,386,915 | 6/1968 | Rutschi et al. | 423/477 |
| 3,585,147 | 6/1971 | Gordon | 252/187 R |
| 3,754,079 | 8/1973 | Callerame | 423/477 |
| 3,836,475 | 9/1974 | Kirner | 252/187 R |
| 4,013,761 | 3/1977 | Ward et al. | 423/477 |

*Primary Examiner*—Benjamin R. Padgett
*Assistant Examiner*—Irwin Gluck
*Attorney, Agent, or Firm*—Cruzan Alexander; Donald M. Sell; Mark A. Litman

[57] ABSTRACT

Chlorine dioxide is generated from aqueous liquids container alkali metal or alkaline earth metal chlorites, and compounds which liberate chlorine in water. Dry, stable, solid compositions, in one or two parts, can be made from these and other ingredients.

25 Claims, No Drawings

GENERATION OF CHLORINE DIOXIDE FOR DISINFECTION AND STERILIZATION

This invention relates to disinfecting and/or sterilizing. In particular the invention relates to a method of providing an aqueous disinfecting and/or sterilizing liquid and to solid compositions which can be used to prepare that aqueous liquid.

Chlorine dioxide is a very powerful oxidizing agent and is an excellent bactericide and antiseptic. In its natural state, however, chlorine dioxide is an explosive gas. Therefore, it is normally not stored as chlorine dioxide but is generated at low concentrations immediately prior to use by chemical reaction from stable precursors, e.g. by making sodium chlorite solutions highly acidic.

According to the invention there is provided a method of generating chlorine dioxide in an aqueous liquid in which chlorine is released in an aqueous liquid containing an alkali metal of alkaline earth metal chlorite by adding to the aqueous liquid a water soluble solid composition containing a chlorine-releasing compound which is stable when dry but releases chlorine when dissolved in water, the chlorine released or chlorine species (as hereinafter defined) subsequently produced generating chlorine dioxide by reaction with the alkali metal or alkaline earth metal chlorite.

The chlorine dioxide can be formed in this way in other than highly acidic solutions. The concentration of chlorine dioxide produced can range from low to medium to high concentrations. Concentrations of 5 to 10 ppm appear to be an optimum concentration in view of the toxicity of chlorine dioxide.

The aqueous liquid formed is a very powerful disinfecting and/or sterlizing liquid, the presence of both the chlorine dioxide and chlorine or chlorine species reducing the chance of forming resistant strains.

The chlorine generated in the solution can be present as free chlorine dissolved in the aqueous liquid or can be present as chlorine species such as chloric, chlorous or hypochlorous acid, formed by reaction of the chlorine with the aqueous liquid. It may be that these chlorine species themselves react with the alkali metal or alkaline earth metal chlorite to release chlorine dioxide or that they initially decompose to chlorine which then reacts to release the chlorine dioxide. By choice of the relative proportions of the alkali metal or alkaline earth metal chlorite and the chlorine-releasing compound the relative amounts of free chlorine and chlorine species can be to some extent predetermined. The chlorine or the chlorine species will generate the required chlorine dioxide by reaction with the alkali metal or alkaline earth metal chlorite.

The aqueous liquid can initially contain chlorine dioxide therein in the form of an alkali metal or alkaline earth metal chlorite, such solutions being commonly known as stabilized chlorine dioxide and referred to as such herein, and this solution will be quite stable provided the pH is kept at neutral or above. Once, however, chlorine is generated in the liquid by addition of the composition containing the chlorine-releasing compound there is an immediate release of chlorine dioxide, a much more immediate release than is the case when such liquids are acidified. On the other hand one can add to water or an aqueous liquid free of the chlorite a composition which contains an alkali metal or alkaline earth metal chlorite and the chlorine-releasing compound.

The water-soluble solid composition added to the aqueous liquid is preferably either in the form of a powder or tablet whether or not it contains the alkali metal or alkaline earth metal chlorite. The composition may if necessary contain a substantial proportion of a solid filler to ensure that it remains as a readily dispensible powder or has sufficient bulk for making into a tablet. The solid filler could be simply an inert filler. Preferably, however, the solid filler is constituted in part or completely by other desirable components for the composition which have additional functions but which will, in the dry solid form of the composition, act as the required filler. Other such desirable components which can constitute the filler partially or completely include one or more buffering components to bring the pH of the aqueous liquid which may initially be tap water and so of very variable hardness to the desired pH and thereafter preserve a pH, a dessicent to ensure storage stability, one or more effervescent reagents which dissolve in water with effervescence to promote dissolution of the composition or as an alternative a tablet disintegrant component, a surfactant to aid in wetting of surfaces and to provide better contact between solutions and the organisms to be destroyed, and in compositions to be made into tablet form a lubricant to assist in release from the tablet die.

Therefore, according to another aspect of the invention there is provided a stable solid composition for addition to water to give a disinfecting and/or sterilizing solution comprising:

(a) a chlorine-releasing component which will release chlorine when in contact with water, (b) an alkali metal or alkaline earth metal chlorite, (c) a buffer, and optionally:

(d) a dessicant to prevent premature chlorine release from the solid composition, (e) one or more effervescent reagents which will react to give effervescence when dissolved in water or alternatively or additionally a tablet disintegrant component, (f) a surfactnat which is stable in the presence of oxidizing agents, (g) a lubricant to assist in release from a tableting machine, the lubricant optionally being constituted in part or completely by one or more of the other components $a$ to $f$ and $h$, and (h) a filler to maintain the composition as a readily dispensible powder or provide sufficient bulk for the composition to be made into a tablet, the filler being constituted by one or more of the components $c$ to $g$ optionally together with an inert filler which does not impair the action of components $a$ and $b$.

This solid composition is suitable for addition to water or aqueous liquids which do not contain any stabilized chlorine dioxide. For addition to stabilized chlorine dioxide solutions the solid composition need not contain the alkali metal or alkaline earth metal chlorite component $b$ and so according to a further aspect of the invention there is provided a stable solid composition for addition to aqueous stabilized chlorine dioxide solutions to give a release of chlorine dioxide and so give a disinfecting and/or sterilizing solution, comprising:

(a) a chlorine-releasing component which will release chlorine when in contact with water, (c) a buffer, and optionally:

(d) a dessicant to prevent premature chlorine release from the solid composition, (e) one or more effervescent reagents which will react to give effervescence when dissolved in water or alternatively or additionally a tablet disintegrant component, (f) a surfactant which is stable in the presence of oxidizing agents, (g) a lubricant to assist in release from a tableting machine, the lubricant optionally being constituted in part or completely by one or more of the other components *a* to *f* and *h*, and (h) a filler to maintain the composition as a readily dispensible powder or provide sufficient bulk for the composition to be made into a tablet, the filler being constituted by one or more of the components *c* to *g* optionally together with an inert filler which does not impair the action of components *a* and *b*.

These solid compositions, whether or not they incorporate component *b* can be prepared, stored and used in the form of a dry powder or can be compressed into tablet form which has the advantage of providing exact amounts of the composition for adding to specified amounts of an aqueous liquid.

The solid composition, whether as a dry powder or as tablets, can be prepared as a two-part formulation with the components *a* to *h* divided between the two parts in various ways. This has the advantage particularly from the point of view of stability that, for example component *a* can be separated until use from any other component which may be hydrated, e.g. because it is difficult or expensive to obtain in an anhydrous form, or otherwise contain or attract traces of water. Additionally it may be desirable for best stability for component *a* to be kept separate from component *b* until use and in this case component *a* and say half of components *c* to *h* can constitute one part of the composition which component *b* and the other half of components *c* to *h* will constitute the other part of the composition. Irrespective of how the components *a* to *h* are divided between the parts of the two-part formulation the total solid composition, when added to water or stabilized chlorine dioxide solutions will have the same characteristics as a one-part formulation. The two-part formulations can be provided in separate compartments of a single two-compartment pack so that the correct relative proportions of the two-parts are available.

The solid compositions are stable when protected from moisture and so can be stored for long periods until required for use provided they are kept dry and anhydrous components are used. Immediately after they are added to water, however, chlorine followed by chlorine dioxide is released. The solid compositions can be formulated so that the concentration for chlorine dioxide in solution is high enough to exhibit excellent bactericidal properties, e.g. usually <10 ppm of chlorine dioxide is effective for B.- *subtilis*, but is still low enough to be safe to handle and use. The resulting solutions can remain active for at least two days, but after this the chlorine dioxide gradually becomes lost from the solution.

The solid compositions, therefore, provide a convenient and easy method of preparing disinfecting and/or sterilizing solutions of high activity. The solutions are, therefore, useful for the sterilization of a variety of surgical instruments and machines, e.g. dialysis machines, and are also useful for maintaining instruments sterile and ready for use.

An important advantage of the compositions of the invention is the immediate release of chlorine dioxide when the compositions are added to water to give solutions of a pH between 3 and 7.

Thus chlorine dioxide can be generated in solutions having a pH close to neutral as compared with conventional procedures in which chlorine dioxide is released from a solution of an alkali metal chlorite by acidifying to a pH of 2 to 3. When the solid compositions are in the form of a two-part formulation it is possible for the chlorine dioxide to be produced in solution at a pH between 3 and about 7 and then for the solution to be buffered to a higher pH in the range 7 to 9 if so desired if the buffer is in a separate second part which is added after the first part which contains the chlorine and chlorine dioxide generating components.

The chlorine-releasing component *a* will be a compound or mixture of compounds which release chlorine upon reaction with water. There are many suitable compounds or mixtures of compounds and the exact choice of compound or compounds determines the rate of release of chlorine and correspondingly the rate of generation of the chlorine dioxide. Examples of suitable compounds are sodium N-chloro-p-toluenesulfonamide, sodium N-chloro benzenesulfonamide, and calcium hypochlorite, but the presently preferred compound is sodium dichloroisocyanurate.

The alkali metal or alkaline earth metal chlorite component *b*, reacts in solution with chlorine to give the required chlorine dioxide. It is believed that, in solution, the overall reaction is somewhat as follows:

$$2ClO_2^- + Cl_2 \rightarrow 2Cl^- + 2ClO_2$$

While any chlorite is apparently suitable, the preferred is sodium chlorite which can be the commercial grade 80% $NaClO_2$.

The solid compositions of the invention include a buffer. This assists in maintaining the pH of the final solution substantially constant and also is desirable to bring the pH of the disinfecting and/or sterilizing solution to the desired pH irrespective of the source of water used. Thus solid compositions of the invention will normally be addded to tap water and this varies from place to place throughout the country. Therefore the amount of buffer must be chosen either to bring the pH of the resulting solution to the desired figure when using the most alkaline tap water likely to be used or can be chosen to bring the pH of the resulting solution to the desired figure when using tap water of a specified maximum alkalinity. The operation of buffers is well known and the man skilled in the art can select buffers and amounts thereof to get any desired pH within the range noted when starting from water of any particular alkalinity.

This buffer, component *c*, can include an alkaline phosphate and examples are disodium hydrogen phosphate, trisodium phosphate, tetrasodium pyrophosphate, sodium hexametaphosphate and sodium tripolyphosphate. The alkaline phosphates, besides acting as buffers also act as detergent builders, and aid in reducing corrosion of metal objects immersed in the final solution. Of course if the buffer chosen does not have these additional properties it may be desirable to include one or more additional components in the solid composition to provide the composition with these additional properties. These alkaline phosphates are not easy to obtain in an anhydrous form. Thus although they can be useful in two-part formulations where they can be kept separate from component $a$, the presently preferred buffer includes an anhydrous salt such as potassium dihydrogen citrate which is readily obtainable in an anhydrous form.

The buffer can also include a solid acid to assist in controlling the pH of the resulting solutions. The acid can be any stable dry acid but is preferably an organic acid with hydroxyl functionality. Examples are citric acid, tartaric acid, malic acid, oxalic acid, adipic acid, suberic acid, sulphamic acid or mucochloric acid. Of these the first three are preferred because they are least corrosive towards metal objects, citric acid being the most preferred. In the case of one component mixtures the acid must be anhydrous. If, however, the mixtures are prepared as a twopart formulation, the acid can be in one part and the anhydrous ingredients such as the chlorine-releasing component, the alkali metal or alkaline earth metal chlorite, and the effervescent salt such as potassium carbonate can be in the other part. In such a case the acid need not be anhydrous to achieve stability of the composition and so the solid acid or its acid salt can be used in an hydrated form in this instance.

The buffer can be constituted at least in part by one or more compounds which also function as the other components $d$ to $h$. Also as noted above the buffer may constitute part of the solid filler.

There are many anhydrous salts which will act as the dessicant, component $d$, whose function is to absorb any traces of moisture in the solid composition, whether from the atmosphere during preparation and before enclosure in a sealed package or present in other components, so conferring storage stability on the chlorine-releasing compound. One suitable example of a dessicant is anhydrous potassium carbonate. This compound can also serve the additional function of producing effervescence with an acid and for simplicity it is obviously desirable if possible to choose the dessicant so that it serves this extra purpose.

When the solid composition is in the form of a tablet it is often convenient to include the effervescent reagents, component $e$, to help to break up the tablet once it has been dropped into water or other aqueous liquids such as stabilized chlorine dioxide solutions. The effervescence may also help to speed up the dissolution of the components of the composition and promote uniform solution. The simplest effervescent components are an alkali such as base or alkaline salt and an acid, e.g. a carbonate or bicarbonate and a weak acid, which will remain stable when dry but which will react when in water to give off carbon dioxide gas. The anhydrous potassium carbonate noted above as a dessicant can be at least part or all of the salt component while the acid can be one of the solid acids noted above.

As an alternative or additionally the solid composition can include a tablet disintegrant component. This can be a material which is anhydrous and swells when it first contacts water. An example of a suitable material is sodium carboxymethylcellulose.

The surfactant, component $f$, serves to improve the wetting properties of the disinfecting solution formed. This aids in wetting surfaces to be sterilized and ensures better contact between the solutions and the organisms to be destroyed and so improves the effectiveness of the solution. The surfactant chosen must be resistant to oxidation by the chlorine dioxide which is a powerful oxidizing agent and must also be capable of being present in a dry solid form in the solid compositions of the invention. Examples of surfactants which have been found to be suitable are complex organic phosphate esters, sodium alkylnaphthalene sulphonates, polyethylene glycols, sodium dioctyl sulphosuccinate, sodium aluryl sulphate and alkyl aryl sulphonates.

When the solid compositions of the invention are to be converted to a tablet form, it is usually desirable to include a lubricant since without this the tablet is not always cleanly ejected from the tableting machine. In some cases one of the other components may provide sufficient lubrication. However, a separate lubricant can be included such as a surfactant or a polyethylene glycol.

In some compositions it may be desirable to include a separate filler, component $h$, since this appears to help to stabilize the solid compositions. The filler is desirably water-soluble and can be inert to the chemical reaction producing the chlorine dioxide. The filler can, however, be another component of the composition such as buffer or part or all of the salt in the effervescent reagents. Thus the filler can be anhydrous sodium bicarbonate or can preferably be anhydrous potassium carbonate.

The various components of the solid compositions of the invention can be present within wide limits and the exact proportions in each case will depend upon the final intended use of the sterilizing and/or disinfecting liquid. By way of example, however, the components are preferably present within the following weight percentage ranges:

component $a$ . . . 0.3 to 26,
component $b$ . . . 3 to 39, and more preferably 5 to 21,
the remainder (including component $c$ and any of components $d$ to $h$ present) . . . 35 to 96.7.

As noted above component $b$ may be omitted completely if the composition is to be added to sterilized chlorine dioxide solutions and in this case the preferred ranges of component $a$ and the remainder would be within the following weight percentage ranges.

component $a$ . . . 0.2 to 43
remainder . . . 57 to 99.8

Within the remainder noted above the components $c$ to $h$ are preferably present in the following weight percentage ranges based on the total weight of the composition:

component $c$ . . . 35 to 97,
component $d$ . . . 0 to 66.5, and more preferably 10 to 25,
component $e$ . . . 0 to 76 and more preferably 40 to 76 when component $e$ is one or more effervescent reagents and 20 to 50 when component $e$ is a tablet disintegrant component.
component $f$ . . . 0 to 11,
component $g$ . . . 0 to 5, and
component $h$ . . . 0 to 50 of a filler which may be the component $c$ or can be formed partially or completely by one or more others of components $d$ to $g$.

The above ranges are based on the case where component $b$ is present. If component $b$ is absent, however, the proportions of components $c$ to $h$ will need to be adjusted accordingly.

The solid compositons of the invention are preferably prepared in the form of a powder. This powder may be used as such or can be converted to tablets in conventional manner by compressing this powder in a tableting-die. The preparation of tablets from powders is well known and for full information on the technique reference is directed, for example, to "Tablet Making" by Arthur Little and K. A. Mitchell published by Northern Publishing Co. Ltd., Second Edition, 1963.

The invention will now be illustrated by the following Examples. These Examples illustrate some variations possible in the solid mixtures, which may be used as powders or tablets. The latter were formed by mixing the ingredients, and compressing the mixture in a tableting-die under a pressure of 1 to 1½ tons over a disc 0.5 inch diameter.

Similar formulations to those given in Examples 1 to 8 but without the sodium chlorite, were used as activators for solutions of sodium chlorite supplied commercially as stabilized chlorine dioxide solutions.

EXAMPLE 1

A solid mixture was prepared having the following composition by weight:

sodium dichloroisocyanurate . . . 2% sodium chlorite . . . 5% sodium bicarbonate . . . 28% potassium carbonate . . . 10% disodium hydrogen phosphate . . . 15% citric acid . . . 30% Alkanol B . . . 10%

(alkanol B is a sodium alkylnaphthalene sulphonate supplied by Du Pont).

1 g of this mixture was compressed into a tablet which dissolved in 1 liter of distilled water with effervescence to give a solution of pH 6.2 and a concentration of chlorine dioxide of 4 ppm. The solution was sporicidal to B.subtilis spores when tested according to an organism suspension method such as that cited by C. W. Chambers, J. Milk and Food Tech., 19:183–187, 1956.

EXAMPLE 2

A solid mixture was prepared having the following composition by weight:

sodium dichloroisocyanurate . . . 6%
sodium chlorite . . . 6%
sodium bicarbonate . . . 12%
potassium carbonate . . . 12%
disodium hydrogen phosphate . . . 37%
citric acid . . . 24%
sodium lauryl sulphate . . . 3%

1 g of this mixture was compressed into a tablet which dissolved with effervescence in 1 liter of distilled water to give a solution of pH 6.5 and a concentration of chlorine dioxide of 6 ppm. The solution exhibited high sporicidal activity against B.subtilis spores when tested by the above referenced suspension method.

EXAMPLE 3

A solid mixture was prepared having the following composition by weight:

sodium dichloroisocyanurate . . . 2%
sodium chlorite . . . 5%
sodium bicarbonate . . . 29%
potassium carbonate . . . 10%
disodium hydrogen phosphate . . . 15%
citric acid . . . 29% sodium lauryl sulphate . . . 10%

1 g of this mixture, when tabletted and dissolved in 1 liter of distilled water, gave a solution of pH 6.3 and a concentration of chlorine dioxide of 2.5 ppm. The solution showed sporicidal activity against B.subtilis spores when tested by the above referenced suspension method.

EXAMPLE 4

This Example illustrates a composition for generating higher concentrations of chlorine dioxide than those shown in Examples 1 to 3. Such a composition is useful when corrosion of metal is not a problem.

A solid mixture was prepared having the following composition by weight:

sodium dichloroisocyanurate . . . 23%
sodium chlorite . . . 9%
sodium bicarbonate . . . 45%
adipic acid . . . 23%

1 g of this mixture after tabletting, was dissolved in 1 liter of distilled water to give a solution of pH 6.4 and a concentration of chlorine dioxide of 25 ppm. The solution exhibited high sporicidal activity against B.subtilis spores when tested by the above referenced suspension method.

EXAMPLE 5

A solid mixture was prepared having the following composition by weight:

sodium dichloroisocyanurate . . . 5%
sodium chlorite . . . 5% disodium hydrogen phosphate . . . 30%
sodium bicarbonate . . . 10%
potassium carbonate . . . 10%
citric acid . . . 30%
Nansa S30 . . . 10%

(Nansa S30 is an alkyl aryl sulphate supplied by the Marchon Division of Albright and Wilson).

1 g of this mixture, after tableting, was dissolved in 1 liter of distilled water to give a solution of pH 6.2 and a concentration of chlorine dioxide of 5 ppm. The solution exhibited high sporicidal activity against B.subtilis spores when tested by the above referenced suspension method.

EXAMPLE 6

The preceding Examples have described compositions which give solutions whose activity against B.subtilis spores have been demonstrated. This Example and those following describe compositions which give solutions of chlorine dioxide. Such solutions could be useful for disinfecting and possibly sterilizing.

A solid mixture was prepared having the following composition by weight:

sodium dichloroisocyanurate . . . 5.6%
sodium chlorite . . . 5.6%
sodium bicarbonate . . . 22.2%
sodium tripolyphosphate . . . 31.1%
malic acid . . . 33.3%
sodium lauryl sulphate . . . 2.2%

1 g of this mixture, after tableting, dissolved in 1 liter of distilled water to give a solution of pH 5.4 and a concentration of chlorine dioxide of 10 ppm.

EXAMPLE 7

A solid mixture was prepared from the following ingredients:

chloramine T . . . 0.2 g
sodium chlorite . . . 0.30 g
sodium bicarbonate . . . 0.27 g After tableting, the mixture dissolved in 1 liter of distilled water to give a solution containing chlorine dioxide at a pH of 5.6.

EXAMPLE 8

A solid mixture was prepared from the following ingredients:

calcium hypochlorite . . . 0.15 g
sodium chlorite . . . 0.10 g
sodium bicarbonate . . . 0.50 g
adipic acid . . . 0.25 g After tableting, the mixture dissolved in 1 liter of distilled water to give a solution containing chlorine dioxide at a pH of 6.6.

EXAMPLE 9

A solid mixture was prepared from the following ingredients:

sodium dichloroisocyanurate . . . 0.05 g
disodium hydrogen phosphate . . . 0.35 g
sodium bicarbonate . . . 0.20 g
citric acid . . . 0.35 g
sodium lauryl sulphate . . . 0.02 g After tableting, the mixture dissolved in 1 liter of a solution of sodium chlorite (approximately 50 ppm) to give a solution containing chlorine dioxide at a pH of 5.8.

EXAMPLE 10

A solid mixture was prepared from the following ingredients:

sodium dichloroisocyanurate . . . 0.03 g
disodium hydrogen phosphate . . . 0.10 g
sodium bicarbonate . . . 0.20 g
potassium carbonate . . . 0.10 g
citric acid . . . 0.43 g
Alkanol B . . . 0.1 g After tableting, the mixture was dissolved in 1 liter of a solution of sodium chlorite (approximately 25 ppm) to give a solution containing chlorine dioxide at a pH of 5.1

EXAMPLE 11

A two-part solid formulation was prepared having the following composition:

Part (a)

anhydrous citric acid . . . 4.4 g
sodium chlorite . . . 0.56 g
sodium dichloroisocyanurate . . . 0.06 g
anhydrous potassium carbonate . . . 4.7 g Part (b)

potassium carbonate . . . 4.7 g

Part a was dissolved in 3.785 liters of water having an alkalinity of 300 ppm of calcium carbonate. Part b was then added to give a resultant pH of 8 and a chlorine dioxide concentration of 18 ppm.

As can be seen by initially adding Part a the release of the chlorine dioxide can be provided at a pH not above 7 and then the addition of the buffer component in Part b adjusts the pH to an alkaline figure at which it is believed that the solution is a highly effective sterilant.

EXAMPLE 12

A two-part solid formulation was prepared having the following composition:

Part (a)

malic acid . . . 12.7 g

Part (b)

anhydrous potassium carbonate . . . 4.13 g
anhydrous sodium dichloroisocyanurate . . . 0.047 g
sodium chlorite . . . 0.561 g
surfactant . . . 0.35 g The two parts a and b were mixed and added to 3.785 liters of water with an alkalinity of 400 ppm calcium carbonate and gave a solution having a pH of 4.3. In this case the malic acid could be the hydrated form without any loss of storage stability of the composition because it is in a part separate from the sodium dichloroisocyanurate.

EXAMPLE 13

A solid mixture was prepared from the following ingredients:

potassium dihydrogen citrate . . . 7.5 g
anhydrous sodium dichloroisocyanurate . . . 0.047 g
sodium chlorite . . . 0.561 g
surfactant . . . 0.2 g This mixture was added to 3.785 liters of water with an alkalinity of 150 ppm of calcium carbonate and gave 12 ppm chlorine dioxide at a pH of 4.3.

EXAMPLE 14

A solid mixture was prepared from the following ingredients:

anhydrous citric acid . . . 10 g
anhydrous potassium carbonate . . . 3.6 g
anhydrous sodium dichloroisocyanurate . . . 0.094 g
sodium chlorite . . . 1.12 g
surfactant . . . 0.3 g This mixture was added to 3.785 liters of water with an alkalinity of 200 ppm of calcium carbonate and give 24 ppm chlorine dioxide at a pH of 4.3.

EXAMPLE 15

A solid mixture was prepared from the following ingredients:

potassium dihydrogen citrate . . . 8 g sodium chlorite . . . 0.561 g
anhydrous sodium dichloroisocyanurate . . . 0.047 g
surfactant . . . 0.2 g This mixture was added to 3.785 liters of water with an alkalinity of 200 ppm of calcium carbonate and gave a pH of 4.3.

I claim:

1. A method of generating chlorine dioxide in an aqueous liquid containing an alkali metal or alkaline earth metal chlorite by adding to the aqueous liquid a water-soluble solid composition containing a chlorine-releasing component consisting of a compound or mixture of compounds which is stable when dry but releases chlorine when dissolved in water, the chlorine released generating chlorine dioxide by reaction with the alkali metal or alkaline earth metal chlorite.

2. A method as claimed in claim 1 in which the concentration of chlorine dioxide formed is from 5 to 10 ppm.

3. A method as claimed in claim 1 in which the composition contains an alkali metal or alkaline earth metal chlorite and the chlorine-releasing compound and that composition is added to water.

4. A method as claimed in claim 1 in which the aqueous liquid contains stabilized chlorine dioxide.

5. The method of claim 1 wherein said chlorine-releasing component is a single compound which releases chlorine in aqueous solution.

6. A stable solid composition for addition to water to give a disinfecting and/or sterilizing solution comprising:
    (a) a chlorine-releasing component consisting of compound or mixture of compounds which will release chlorine when in contact with water,
    (b) an alkali metal or alkaline earth metal chlorite,
    (c) a buffer, and optionally
    (d) a dessicant to prevent premature chlorine release from the solid composition,
    (e) an effervescent reagent which will react to give effervescence when dissolved in water,
    (f) a surfactant which is stable in the presence of oxidizing agents,
    (g) a lubricant to assist in release from a tableting machine,
    (h) a filler to maintain the compositions as a readily dispensible powder or provide sufficient bulk for the composition to be made into a tablet.

7. A solid composition as claimed in claim 6 in which component $b$ is anhydrous sodium chlorite.

8. A solid composition as claimed in claim 6 in which component $a$ is present in an amount of from 0.3 to 26% by weight, component $b$ is present in an amount of from 3 to 39% by weight, and the remainder including component $c$ and any of components $d$ to $h$ present constitutes from 35 to 96.7% by weight.

9. A solid composition as claimed in claim 7 in which component $a$ is present in an amount of from 0.3 to 26% by weight, component $b$ is present in an amount of from 3 to 39% by weight, and the remainder including component $c$ and any of components $d$ and $h$ present constitutes from 35 to 96.7% by weight.

10. The composition of claim 6 wherein said chlorine-releasing component is a single compound which releases chlorine in aqueous solution.

11. A stable solid composition for addition to an aqueous stabilized chlorine dioxide solution to give a release of chlorine dioxide and so give a disinfecting and/or sterilizing solution, comprising:
    (a) a chlorine-releasing component which will release chlorine when in contact with water, and
    (c) a buffer.

12. The stable solid composition of claim 11 containing at least one of the following:
    (d) a dessicant to prevent premature chlorine-release from the solid composition,
    (e) at least one effervescent reagents which will react to give effervescence when dissolved in water or alternatively or additionally a tablet disintegrant component,
    (f) a surfactant which is stable in the presence of oxidizing agents,
    (g) a lubricant to assist in release from a tableting maching,
    (h) a filler to maintain the compositions as a readily dispensible powder or provide sufficient bulk for the composition to be made into a tablet, the filler comprising an inert filler which does not impair the chlorine releasing action of components $a$ and $b$.

13. A stable solid composition as claimed in claim 12 in which component $a$ is present in an amount of from 0.2 to 43% by weight, and the remainder including component $c$ and any of components $d$ to $h$ present constitutes from 57 to 99.8% by weight.

14. A stable solid composition as in claim 12 in which the chlorine releasing component is sodium dichloroisocyanurate.

15. A stable solid composition as in claim 12 in which the buffer component $c$ includes an alkaline phosphate.

16. A stable solid composition as in claim 12 in which the buffer component $c$ includes anhydrous potassium dihydrogen citrate.

17. A stable solid composition as in claim 12 in which the buffer component $c$ includes a solid acid.

18. A stable solid composition as in claim 17 in which the solid acid is anhydrous citric acid.

19. A stable solid composition as claimed in claim 12 which contains a dessicant and the dessicant is anhydrous potassium carbonate.

20. A stable solid composition as in claim 12 which contains one or more effervescent reagents and these reagents are a base or an alkaline salt and an acid.

21. A stable solid composition as claimed in claim 20 in which the effervescent reagents are anhydrous potassium carbonate, and anhydrous citric acid.

22. A stable solid composition as in claim 12 which contains a tablet disintegrant component which is sodium carboxymethyl cellulose.

23. A stable solid composition as in claim 12 which contains a surfactant and the surfactant is a complex organic phosphate ester, sodium alkylnaphthalene sulphate, polyethylene glycol, sodium dioctyl sulphosuccinate, sodium lauryl sulphate or alkyl aryl sulphonate.

24. A stable solid composition as in claim 12 which is in the form of a dry solid powder.

25. A stable solid composition as in claim 12 which is in the form of a tablet.

* * * * *

UNITED STATES PATENT AND TRADEMARK OFFICE
CERTIFICATE OF CORRECTION

PATENT NO. : 4,104,190

DATED : August 1, 1978

INVENTOR(S) : Stephen R. Hartshorn

It is certified that error appears in the above-identified patent and that said Letters Patent are hereby corrected as shown below:

Abstract, line 2, "container" should be --containing--; and

Column 3, line 54, "concentration for chlorine" should be --concentration of chlorine--.

Signed and Sealed this

Thirteenth Day of February 1979

[SEAL]

Attest:

RUTH C. MASON
Attesting Officer

DONALD W. BANNER
Commissioner of Patents and Trademarks